United States Patent [19]

Irimies

[11] Patent Number: 5,493,833
[45] Date of Patent: Feb. 27, 1996

[54] WELDING STUD AND METHOD OF FORMING SAME

[75] Inventor: Cornel P. Irimies, Grafton, Ohio

[73] Assignee: TRW Inc, Cleveland, Ohio

[21] Appl. No.: 53,209

[22] Filed: Apr. 27, 1993

Related U.S. Application Data

[63] Continuation-in-part of Ser. No. 879,794, May 6, 1992.

[51] Int. Cl.⁶ .............................. F04B 5/19; F16B 19/00
[52] U.S. Cl. .............................. 52/336; 52/334; 219/98; 411/171; 411/501; D8/382; D8/386
[58] Field of Search .............................. 52/334, 335, 336, 52/506.01, 506.02, 506.03, 506.05; 411/171, 403, 481, 501, 504, 505, 901, 923, 930; D8/386; 219/98, 99

[56] References Cited

U.S. PATENT DOCUMENTS

| | | |
|---|---|---|
| 1,911,180 | 5/1933 | Corlett . |
| 1,933,737 | 11/1933 | Kaufman .............................. 411/500 |
| 2,006,852 | 7/1935 | Wilcox .............................. 411/500 |
| 2,027,980 | 1/1936 | Horton . |
| 2,064,918 | 12/1936 | Kaufman . |
| 2,505,915 | 5/1950 | Salmi .............................. 411/930 |
| 2,799,027 | 7/1957 | Hatebur . |
| 3,016,655 | 1/1962 | Hosbein .............................. 52/506.02 |
| 3,088,140 | 5/1963 | Carlson .............................. 411/403 |
| 3,279,517 | 10/1966 | Logan .............................. 411/171 |
| 3,310,822 | 3/1967 | McClellan et al. . |
| 3,356,401 | 12/1967 | Bertram .............................. 52/506.05 |
| 3,720,029 | 3/1973 | Curran .............................. 52/334 |
| 3,760,143 | 9/1973 | Rondeau et al. .............................. 428/583 |
| 3,978,538 | 9/1976 | Fick . |
| 4,007,563 | 2/1977 | Nakagawa .............................. 52/334 |
| 4,023,225 | 5/1977 | Tochilkin et al. . |
| 4,684,304 | 8/1987 | Franks .............................. 411/171 |
| 4,741,138 | 5/1988 | Rongoe, Jr. .............................. 52/334 |

Primary Examiner—Michael Safavi
Attorney, Agent, or Firm—Fay, Sharpe, Beall, Fagan, Minnich & McKee

[57] ABSTRACT

A welding stud designed to have reduced weight without loss of strength by having a stepped diameter, cylindrical form shank with a relatively thin head. The head is centrally depressed and the shank is of a first relatively large diameter closely adjacent the head and is extruded to a smaller diameter from there to the end opposite the head. The weight is additionally reduced by providing the head with a central depression which extends into the head from the axial outer end. The method of forming the stud starts with a workpiece of a diameter larger than the final desired stud diameter and cold heading the workpiece to form the stud head. Thereafter, the shank of the workpiece from a point spaced from the head to the free end of the shank is extruded through a circular die to reduce its diameter to the desired final diameter throughout the majority of its length.

10 Claims, 2 Drawing Sheets

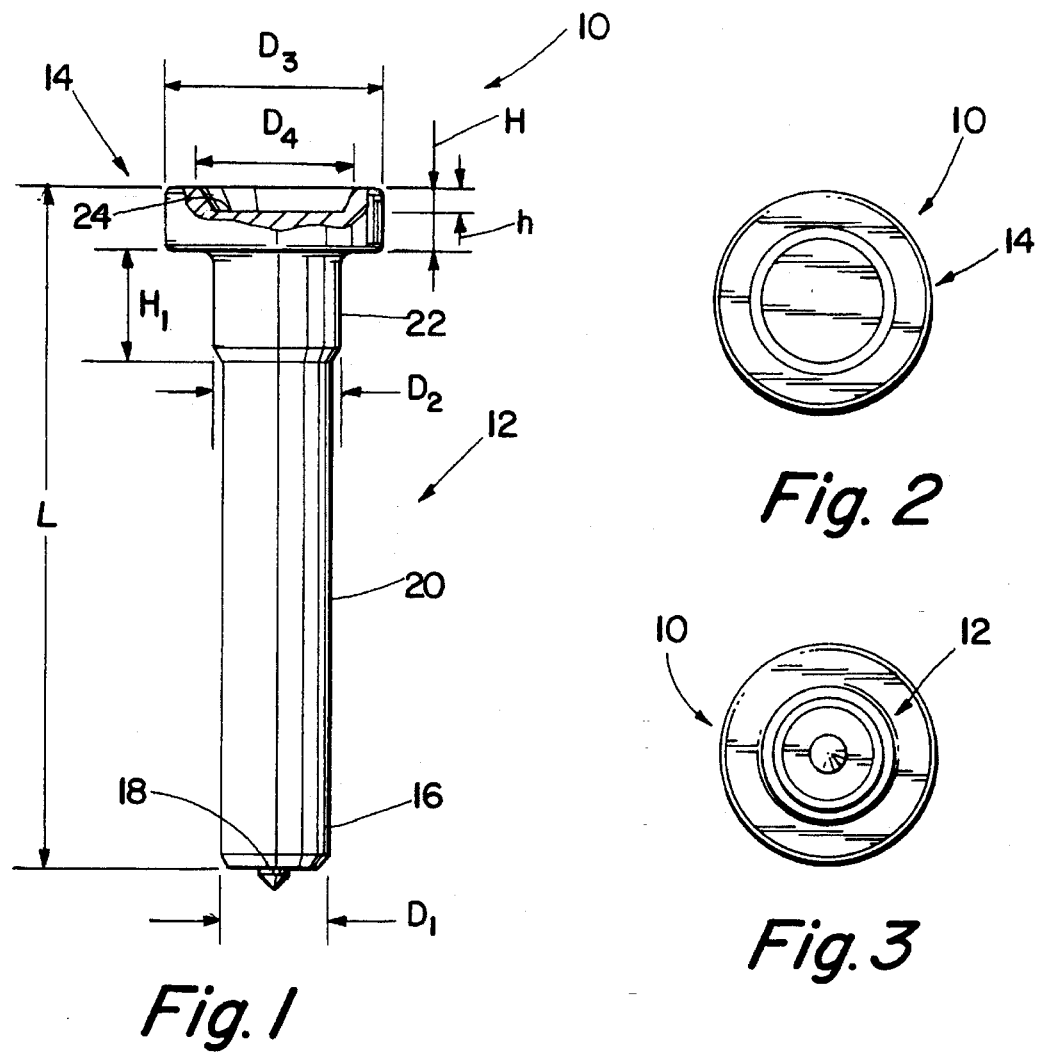
Fig. 1
Fig. 2
Fig. 3
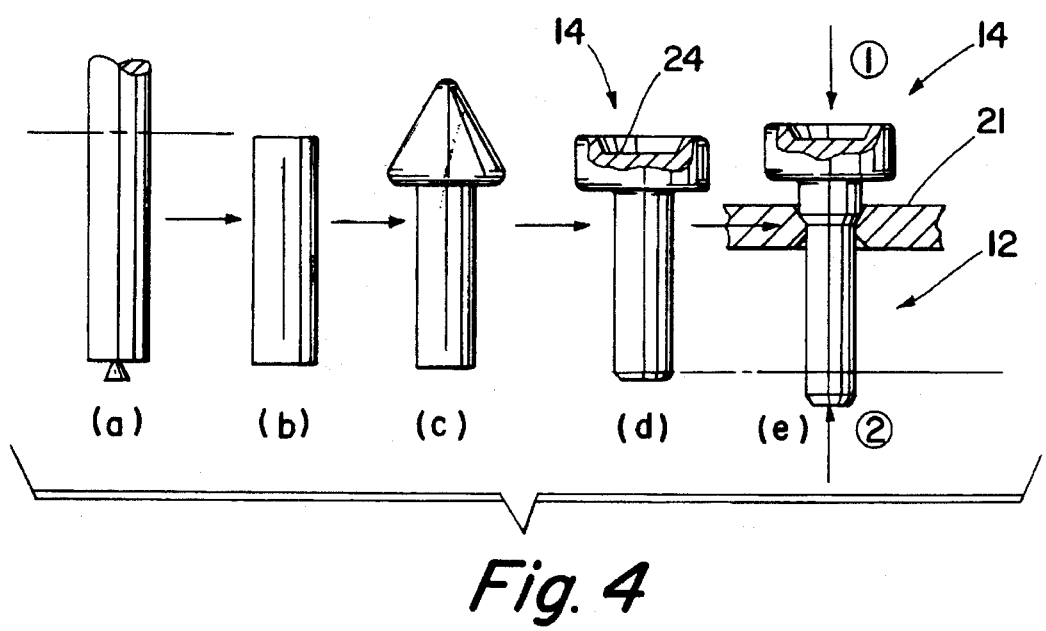
Fig. 4

WELDING STUD AND METHOD OF FORMING SAME

BACKGROUND OF THE INVENTION

This is a continuation-in-part application of U.S. application Ser. No. 07/879,794, filed May 6, 1992, for "Extruded Shear Connection".

The subject invention is directed toward the art of stud welding and, more particularly, to an improved welding stud and a method of forming the same.

The stud welding process is relatively widely used in the construction industry for connecting concrete anchor studs and shear studs to steel floor decks, structural beams, and similar elements. The studs are generally made of steel. Their size for any installation is, of course, determined by the load to which they will be subjected and other engineering considerations. For example, the shank diameter is determined by the strength of the steel from which the stud is formed and the loads which will be applied in tension, shear, or bending. The size of the head on the stud is similarly controlled by the manner in which the stud is used. For example, head size can be influenced by the loads and the manner in which they are applied to the stud.

The manufacture of the studs is typically a cold header operation in which coils of wire or rod are straightened and passed to a cold forming machine wherein the wire or rod is cut to the desired length then cold formed. Generally, the maximum head diameter which can be achieved is directly related to the diameter of the wire or rod being headed. That is, there is a practical limit as to the maximum diameter of head that can be formed through cold heading on a rod of a particular diameter without greatly increasing the cost required to make the product.

BRIEF STATEMENT OF THE INVENTION

The subject invention provides a welding stud design and method of forming the same which produces a savings in material without a loss in performance. This is achieved by a stud having a specially designed shank. The shank is of cylindrical form with a relatively thin cylindrical head formed on one end. The shank is extruded from a first relatively large diameter at a point adjacent the head to a constant lesser diameter throughout the shank length to the end opposite the head. The extruding gives the shank improved physical and mechanical properties so that the resulting reduced diameter portion can perform equivalent to the original full unextruded diameter. The length is, of course, increased by the extruding. This allows studs of the required length to be formed from shorter starting blanks.

According to a further aspect of the subject invention, there is provided an improved method of forming the improved welding studs. The method includes determining the diameter $D_1$ required for the shank of the stud taking into account the strength the stud material will have in its final, extruded form and providing a length of material having a diameter $D_2$ which is greater than $D_1$. An integral head is formed on one end of the length of material with the head having a diameter $D_3$ which is greater than $D_2$ and a height H which is less than $D_2$. Thereafter, the length of material is extruded through a circular forming die to reduce the diameter of the length of material to $D_1$ throughout the full shank portion from the opposite terminal end of the length of material to a first point spaced no more than about $D_1$ from the head.

As can be appreciated, diameter $D_1$ depends upon the type of material selected for forming the stud and the particular loads to which the stud is to be subjected. By beginning with a slightly larger diameter of material $D_2$, a head having the full maximum dimensions required can easily be formed, and thereafter, the diameter $D_2$ can be reduced to the previously determined diameter $D_1$. By using a relatively high strength material, diameter $D_1$ can be further reduced, while yet allowing a head having the full size to be cold formed onto the stud because of the larger diameter $D_2$ of the shank adjacent the head end of the stud. In addition, the extruding step acts to further increase the strength of the material. Consequently, the resulting stud can be significantly smaller and of lower weight than prior studs having the same head diameter and intended for the same use. Thus, not only is there a resultant savings in material, but the weight reduction produces a significant freight and shipping savings.

In accordance with a further aspect of the invention, it is contemplated that the method can include the additional step of forming an inwardly extending depressed area in the center of the head. This results in providing a still further reduction in total material required for forming the stud while assuring that the required head diameter is maintained and that the head thickness is adequate to allow the stud to be chucked in a conventional stud welding gun.

In accordance with a still further aspect of the invention, the head is formed to have a diameter $D_3$ which is between 1.2 and 2 times as great as $D_2$. It is also contemplated that $D_2$ is preferably no more than about 10% greater than $D_1$ throughout its length. With this type of size differential, the extruding step can readily be carried out using conventional extruding equipment.

As can be seen from the foregoing, a primary object of the subject invention is the provision of a welding stud design and method of forming the studs for use in the construction industry in a manner which allows a stud for a given load to have a smaller shank diameter than previously.

A still further object of the invention is the provision of a stud design and method of forming the same wherein significant weight savings can result without sacrificing the stud strength requirement.

Yet another object is the provision of a method of the general type described which can be carried out using conventional cold forming and drawing equipment.

A further object of the invention is the provision of a stud configuration which results in a savings of material in the formation of such studs.

BRIEF DESCRIPTION OF THE DRAWINGS

The above and other objects and advantages will become apparent from the following description when read in conjunction with the accompanying drawings wherein:

FIG. 1 is a side elevational view, partially sectioned away, showing a welding stud for construction purposes formed in accordance with the subject invention;

FIG. 2 is a top view of the head of the stud of FIG. 1;

FIG. 3 is a bottom view looking toward the lower end of the stud shank;

FIG. 4 shows the forming sequence used to form the stud of FIG. 1;

DETAILED DESCRIPTION OF THE PREFERRED AND ALTERNATE EMBODIMENTS

Figure 5:
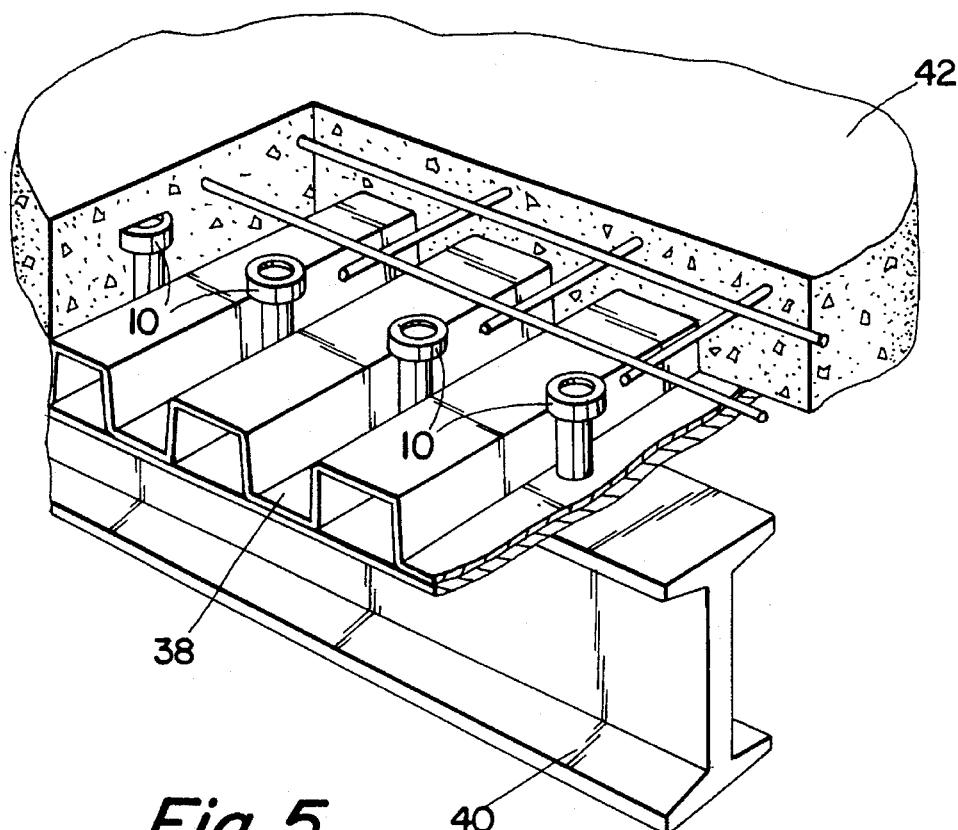
FIG. 5 is an isometric view (with portions broken away) showing the stud of the invention used as a shear connector in an embedment situation in a steel and concrete structure; and, FIG. 6 is a cross-sectional view showing the stud of the invention used in a combined shear and tension loading in an embedment situation in a steel and concrete structure.

Referring more particularly to the drawings wherein the showings are for illustrating a preferred embodiment of the invention only and not for the purpose of limiting same, FIG. 1 shows the overall arrangement of an elongated welding stud of the type used in construction and, depending upon the relative dimensions and intended specific use is referred to as a concrete anchor or a shear stud. In the embodiment shown, the stud 10 comprises an elongated shank portion 12 having an integral head portion 14 formed on one end thereof. Typically, the shank portion 12 includes a lower end section 16 which has a core insert of suitable welding flux 18 carried therein to allow end section 16 to be welded to a base material, usually steel or iron, using conventional stud welding processes. The shank portion 12 has, in this embodiment, two integrally joined separate sections 20 and 22 of stepped diameter. Section 20 is of diameter $D_1$, and this diameter $D_1$ is selected using ordinary engineering calculations and based on the strength of the particular material from which the stud is to be made taking into account the various shear, tension, and bending loads to which the stud will be subjected in its intended manner of use. The strength of the material, as extruded, is used in this calculation. Section 22 of the shank 12 is of a slightly larger diameter $D_2$. This section 22 directly and integrally joins with the head section 14. In the embodiment under consideration, the section 22 of shank 12 is shown as having a total length $H_1$. The reason for the larger diameter section 22 and the length $H_1$ will subsequently be described and discussed; however, for the present, it should be noted that head 14 is of cylindrical configuration and has a maximum diameter $D_3$ which is significantly larger than the shank diameter. Preferably, the head has a thickness H and provided with an axially inwardly depressed center portion 24.

The diameter $D_3$ of the head portion 14 is determined by consideration of the intended use of the stud, such as the type of forces to which it will be subjected and/or the particular type of material into which it will be embedded when it is used as a concrete anchor. Similarly, the thickness H of the head is determined by the strength requirements for the head and the chucking requirements of the stud welding guns which will be used to apply the studs.

Many different classes or grades of steel could be used in the practice of the invention; however, grades SAE 1010 through SAE 1020 have been used and perform adequately. Additionally, however, more highly alloyed steels could be used if desired.

Normally, in the formation of studs of the general type discussed with reference to FIG. 1, the shank diameter is selected so as to allow the head to be formed to its required dimensions through the use of standard and well known cold heading operations. The maximum diameter to which the head can practically be formed is generally limited by the nature of the forming operation and the cold flow properties of the particular material being worked.

In the subject invention, the stud formation is determined by selecting a particular material and determining the diameter $D_1$ needed for the major portion of the shank. In determining diameter $D_1$, the strength of the stud material as extruded is used. Consequently, diameter $D_1$ will be smaller then it would have been had the material not been strengthened through the extrusion process. Subsequently, the process includes selecting and providing a length of material of a diameter $D_2$ which is larger than $D_1$ which will ultimately form section 22 of the shank 12. Thereafter, as illustrated in FIG. 4, the material shown in step (a) is cut to length as shown in step (b). This length is generally empirically determined considering the subsequent steps which are performed. Thereafter, the head is progressively formed as generally illustrated in FIG. 4, steps (c) and (d). In step (c), the head is upset to generally move stud material into a larger diameter knob, and in step (d), the knob is struck to form the desired head profile. The formation of the head takes place using standard cold forming techniques and includes forming the depressed center section 24. After the head portion 14 has been fully formed as shown in FIG. 4, step (d), the final step involves extruding the length of shank material beginning at the lower end of portion 22 and continuing through the lower terminal end of the shank, to reduce its diameter to diameter $D_1$ and form the shank section 20. Extruding is carried out by forcing the stud axially into one circular forming die 21 and then driving or pulling it back out. The extruding can be done in a series of reduction steps or in a single step depending upon the material selected and/or the degree of diameter reduction to be achieved. If a substantial reduction is required and the extrusion is performed in a progressive series of reductions, intermediate annealing may be necessary.

The length $H_1$ of section 22 is maintained at a size sufficient to allow guiding and stabilization of the stud during the extruding operation and to assure that the area between the shank 12 and the head 14 is not in any way detrimentally affected during the extrusion operation. The thickness H of the head 14 is maintained at a predetermined minimum level to assure that the ability to chuck the piece properly for subsequent operations is maintained. It has been found that $H_1$ should preferably be no less than one-half of $D_2$ to allow the gripping and stabilization to be readily carried out.

The extruding operation not only reduces the diameter to that which was previously determined, but also acts to increase the tensile and shear strength per unit of cross-sectional area by densifying and work hardening the material. The amount of work hardening and the degree to which the properties of the stud are improved depend upon the starting material. The strength improvement achieved through the extrusion process acts to allow the final diameter $D_1$ to be a lower predetermined value.

After the stud is in the final form as shown in FIG. 4(e), it is typically loaded with a suitable welding flux.

As can readily be appreciated, many different relative sizes of shank length and diameter, as well as head thickness and diameter could be used within the scope of this invention. However, the following chart illustrates a typical range of various dimensions for the listed nominal stud sizes.

CHART A

| NOMINAL SIZE/ DIM'S IN INCHES | $D_2$ | $D_1$ | $D_3$ | $D_4$ | H | h | $H_1$ |
|---|---|---|---|---|---|---|---|
| GROUP I: | | | | | | | |
| ½ ∅ | .500 | .456 | 1.000 | .680 | .312 | .125 | .375 |
| ⅝ ∅ | .625 | .562 | 1.250 | .875 | .312 | .125 | .500 |
| GROUP II: | | | | | | | |
| ¾ ∅ | .750 | .680 | 1.250 | .875 | .375 | .125 | .625 |
| ⅞ ∅ | .875 | .796 | 1.375 | 1.000 | .375 | .093 | .750 |
| 1 ∅ | 1.000 | .906 | 1.500 | 1.125 | .500 | .062 | .875 |

The foregoing chart shows concrete anchor studs of a nominal ½ and ⅝ inch diameter in group 1 and shear studs of ¾, ⅞, and 1 inch diameter in group 2. The various dimensions given are with reference to FIG. 1 of the drawings. It should be appreciated that the particular dimensions given are examples only and that these could vary significantly within the scope of the invention.

FIG. 5 is an isometric view through a composite concrete and steel structure showing studs formed in accordance with the subject invention being used in a manner which subjects the stud primarily to shear loading but some tension loading is also present. In particular, the studs 10 are shown used as shear connectors with a metal deck 38 and a steel base or beam member 40 for the purpose of achieving interaction between the steel beam and the steel reinforced concrete slab 42 and resisting forces, primarily shear forces, acting along the beam/slab structure. As illustrated, the steel beam or base member 40 has studs 10 welded thereto through the deck 38. The studs are embedded in the concrete 42 throughout their entire length L.

As a general matter, the embedded shear capacity of a headed anchor stud is known to be dependent upon the following factors:

1. Concrete Properties
   A. Weight
   B. Compressive Strength
   C. Modulus of elasticity
2. Headed Stud Size
   A. Shank area
   B. Stud height to diameter ratio
   C. Steel Strength
3. Boundary Conditions of the Surrounding Concrete
4. Stud Spacing or Grouping However, when headed stud connectors of the type under consideration are used in shear in normal weight concrete, it is known that full shear capacity is generally developed when the full stud height after welding, as measured from the top of the head to the base plate, is four or more times the diameter $D_2$.

Figure 6:
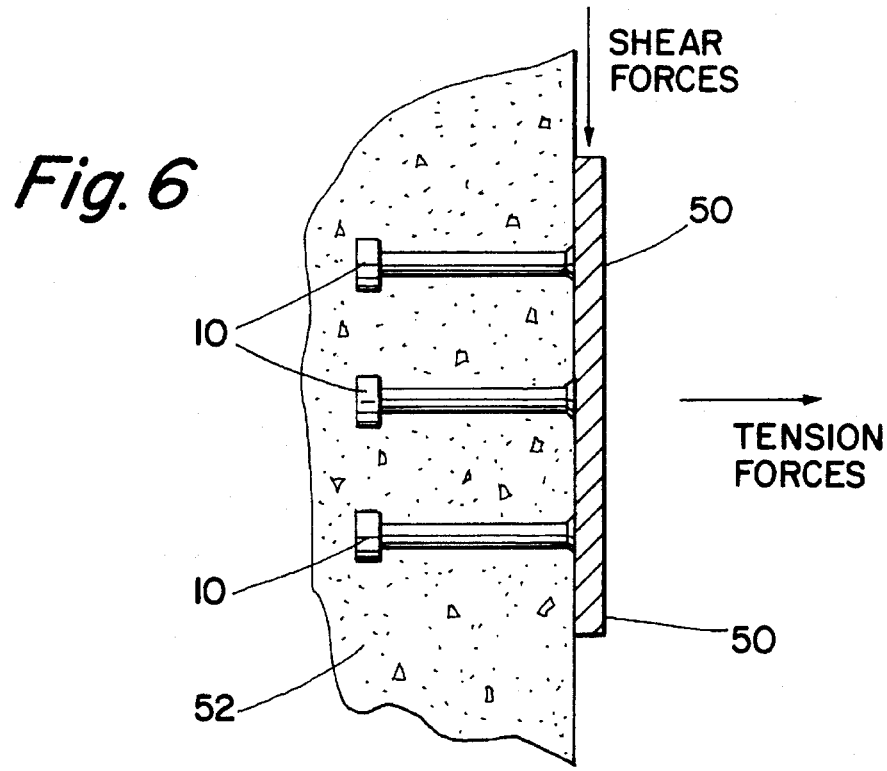

FIG. 6 is a view showing a stud formed in accordance with the invention used in an embedment situation in a combined steel and concrete structure. The stud 10 is welded to a steel base member 50 and fully embedded in concrete 52. The orientation of the various components and the applied loads are such that the stud 10 is loaded primarily in tension. Headed studs embedded in concrete and subjected to tension forces produce a failed concrete section of conical shape. The area of this conical section that fails is primarily dependent upon the following factors:

1. Concrete Compressive Strength
2. Concrete Weight
3. Headed Anchor Size
   A. Length of embedment
   B. Head diameter
4. Boundary Conditions
5. Anchor Spacing or Grouping As the depth of embedment of the headed anchor continues to increase, the area of the conical section that may be pulled out increases proportionately up to the point of full embedment.

At an embedment depth of some 8 to 10 times the shank diameter, the capacity of the concrete contained with in the conical area exceeds the tensile strength of the steel in the headed stud. At that area of development, the stud rather than the concrete fails. Beyond the full embedment of 8–10 diameters, conical area failure does not apply since strength is limited by the stud embedment capacity.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A welding stud comprising:

an elongated, generally cylindrical metal shank terminating in spaced first and second ends;

a cylindrical head of a first diameter and a predetermined height formed integrally on the first end of the shank;

welding flux in the second end of the shank;

the shank having a first portion of a second diameter; and, a second portion of the shank of a diameter that is constant from the first portion to the second end of the shank an no less than about 20% smaller than the second diameter.

2. The stud as defined in claim 1 Wherein the first diameter is at least about 1.5 times as large as the second diameter.

3. The stud as defined in claim 2 wherein the head has a depression extending axially inward.

4. The stud as defined in claim 3 wherein the height of the head is significantly less than the first diameter.

5. The stud as defined in claim 1 wherein the first diameter is at least about 3 times as great as the height of the head.

6. A welding stud comprising:

an elongated, generally cylindrical metal shank terminating in spaced first and second ends;

an enlarged head of predetermined height formed as one piece with the shank on the first end of the shank;

welding flux in the second end of the shank; and, an axially inwardly extending depression of a predetermined depth formed in the head to reduce the weight of the stud without significantly altering the effective load carrying capacity of the stud.

7. The welding stud of claim 6 wherein the depth of the depression in the head is at least one-third of the height of the head.

8. The welding stud of claim 7 wherein the head is of cylindrical shape of a first diameter and the shank has a second small diameter throughout the major portion of its length.

9. The welding stud of claim 8 wherein the axially inwardly extending depression has a circular peripheral shape.

10. The welding stud of claim 9 wherein the diameter of the depression is greater than one-half of the first diameter.

* * * * *